UNITED STATES PATENT OFFICE.

JOHN PATTERSON, OF PHILADELPHIA, PENNSYLVANIA.

FERTILIZER.

SPECIFICATION forming part of Letters Patent No. 438,859, dated October 21, 1890.

Application filed March 4, 1890. Serial No. 342,635. (No specimens.)

*To all whom it may concern:*

Be it known that I, JOHN PATTERSON, of the city of Philadelphia and State of Pennsylvania, have invented a certain new and useful Improvement in Fertilizers; and I do hereby declare the following to be a full, clear, and exact description thereof.

My invention has relation to compounds or fertilizing compositions for enriching the soil; and it consists in the elements and ingredients hereinafter particularly described.

The object of my invention is to produce a compound or composition containing certain chemical properties and ingredients which, when in combination and after a certain period of exposure to light and heat, produce substantially like properties and ingredients as those subtracted from the soil, such as what is commonly known as "plant-food,", and which when applied to the soil enriches the the same and artificially produces abundant growth.

My improved fertilizing compound consists in the following ingredients, and are preferably divided into the following relative proportions, though other proportions may be employed for different soils, viz: unslaked caustic lime, twelve hundred pounds, (1,200;) pulverized gypsum or land-plaster, twelve hundred pounds, (1,200;) pulverized rotten rock, three thousand one hundred and fifty pounds, (3,150;) muck or common bog deposit, four thousand pounds, (4,000;) sulphate of iron or copperas, three hundred pounds, (300,) and common salt, one hundred and fifty pounds, (150;) total, ten thousand pounds, (10,000.)

The unslaked lime, the pulverized gypsum, rotten rock, and muck are first mixed together, and to this compound is then added the sulphate of iron or copperas and the common salt, which have been previously slaked or dissolved together in water of proper proportions. Water is then added to the entire compound thus commingled in sufficient quantities to slake the lime, the entire mass becoming a hot powdered mixture. It is then preferably allowed to remain under cover accessible to light and heat, adding a little additional lime, if necessary, to keep up a high degree of temperature. In order to properly displace the plant-food in the gypsum and rotten rock and the sulphate of iron in the muck or bog, the compound is allowed to remain from three to twelve months, as may be desirable for the particular purposes for which it is to be used.

The relative proportions of the various soluble materials composing the compound may be somewhat varied and deviated from, as herein set forth, as preferable proportions, and yet not deviate from my invention.

The caustic lime sets free phosphoric acid, potash, and ammonia, which are otherwise insoluble, and makes a rich plant-food for all wine-growing fruits, such as the peach, the plum, and all large seed-growing fruits.

The pulverized gypsum acts upon the lime, as well as being acted upon by the lime, and gives forth sulphate of iron. The rotten rock gives out phosphoric acid, potash, and all plant-foods, which are generally insoluble without the action of the lime and plaster, and analysis shows it to contain potassa, soda, lime, magnesia, oxide of iron, alumina, phosphoric acid, sulphuric acid, chlorine, and silica in various proportions, which proportions differ often in different qualities of stratified rotten rock. Analysis shows the usual and frequent proportions to be as follows: Potassa, 12; soda, 8; lime, 3.16; magnesia, 7.02; oxide of iron, 0.64; alumina, 0.10; phosphoric acid, 39.32; sulphuric acid, 0.4; chlorine, 0.2, and silica, 29.16; total, one hundred parts.

The bog is made soluble by the action of the former ingredients upon it, and during exposure to the light and heat forms by reason of its composition a rich plant-food, which is sweetened by the action of the other ingredients.

The sulphate of iron assists to displace the chemical parts composing the other ingredients, and the salt assists to make the entire compound in combination a sweeter and a richer plant-food.

It is material and important in the manufacture and formation of my improved fertilizer that the several ingredients of which the compound is composed remain commixed and commingled in the manner described and exposed to the light and heat for a period of several months in order to properly allow the displacement of the chemical properties which form the rich plant-food of the several ingredients and to allow of a chemical action of the one upon the other, and which would not occur if they were applied to the soil separately.

Phosphoric acid, potash, and ammonia are the essential fertilizing substances and properties requisite in the production of crops, and the rendering of these elements soluble and the commingling of them in my improved compound with the soil recovers the fertility of worn-out lands and enriches others, producing a superior growth. It supplies to the soil and to the roots of vegetation the very elements that must be extracted from the soil to produce cereals, vegetables, and fruits, &c., especially wine-growing fruits and peaches, which latter require an abundance of mineral acids to form the wood fiber and to preserve the vitality of the bud, in the absence of which it is liable to the disease known in this country as the "yellows." The same thing applies to the coffee-growing districts.

The composition may be prepared at a very low cost by the farmers according to their needs, or by manufacturers in large quantities in broken or pounded form for sale and shipment.

Having thus described my invention, what I claim, and desire to secure by Letters Patent, is—

1. The within-described fertilizing compound, composed of caustic lime, gypsum, rotten-rock, common bog, sulphate of iron, salt, and water united and commingled in desirable proportions and treated substantially as hereinbefore set forth and described.

2. The within-described fertilizing compound, composed of caustic lime unslaked when introduced, gypsum or land-plaster, rotten-rock, muck, sulphate of iron, salt, and water commingled substantially as hereinbefore set forth and described.

3. The within-described fertilizing compound, composed of caustic lime unslaked when first commingled with the other ingredients of the composition, gypsum, pulverized rotten-rock, muck, sulphate of iron, salt, and water mixed and commingled in desirable proportions and exposed when in combination in their commingled form in the manner and for the purposes substantially as herein set forth and described.

In witness whereof I have hereunto set my hand this 1st day of March, A. D. 1890.

JOHN PATTERSON.

Witnesses:
WM. L. NEVIN,
R. M. FLEISCHMANN.